United States Patent
Dammert et al.

(10) Patent No.: US 10,788,587 B2
(45) Date of Patent: Sep. 29, 2020

(54) METHOD FOR DETERMINING A SYNTHETIC APERTURE OF A SAR USING GNSS

(71) Applicant: SAAB AB, Linkoeping (SE)

(72) Inventors: Patrik Dammert, Goeteborg (SE); Hans Hellsten, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/648,314

(22) PCT Filed: Sep. 19, 2018

(86) PCT No.: PCT/SE2018/050956
§ 371 (c)(1),
(2) Date: Mar. 18, 2020

(87) PCT Pub. No.: WO2019/066698
PCT Pub. Date: Apr. 4, 2019

(65) Prior Publication Data
US 2020/0225360 A1    Jul. 16, 2020

(30) Foreign Application Priority Data

Sep. 29, 2017 (SE) ...................................... 1751209

(51) Int. Cl.
*G01S 19/22* (2010.01)
*G01S 19/30* (2010.01)
(Continued)

(52) U.S. Cl.
CPC .......... *G01S 19/22* (2013.01); *G01S 13/9004* (2019.05); *G01S 19/254* (2013.01); *G01S 19/30* (2013.01); *G01S 19/37* (2013.01)

(58) Field of Classification Search
CPC ...... G01S 13/87; G01S 13/9004; G01S 19/22; G01S 19/254; G01S 19/30; G01S 19/37; G01S 19/39; G01S 19/51
See application file for complete search history.

(56) References Cited

U.S. PATENT DOCUMENTS 6,232,922 B1 * 5/2001 McIntosh .............. G01S 13/586
342/453
8,610,041 B1 12/2013 Boardman
(Continued)

FOREIGN PATENT DOCUMENTS

EP         0583972 A1    2/1994
EP         2535735 A1    12/2012
(Continued)

OTHER PUBLICATIONS

International Searching Authority, International Search Report and Written Opinion for International Application No. PCT/SE2018/050956, dated Nov. 29, 2018, (10 pages), European Patent Office, Rijswijk, The Netherlands.
(Continued)

*Primary Examiner* — Dao L Phan
(74) *Attorney, Agent, or Firm* — Alston & Bird LLP

(57) ABSTRACT

The present invention relates to a method for determining a synthetic aperture of a synthetic aperture radar, SAR, system using information from a global navigation satellite system,
(Continued)

GNSS, which includes a plurality of satellites each transmitting a radio frequency signal comprising a unique pseudo random number, PRN. The method comprises: receiving the radio frequency signal from a group of satellites in the GNSS, determining a first maximum correlation peak of the PRN of the received radio frequency signal from each satellite in the group of satellites, determining the phase shift between the first determined maximum correlation peak and a second determined maximum correlation peak of a received PRN from the same satellite at a later time, for each satellite in the group of satellites, determining a line-of-sight, LOS, movement of the SAR system relative each of the satellites in the group of satellites by means of the determined phase shift for each satellite in the group of satellites, and determining a synthetic aperture using the LOS movement relative each satellite in the group of satellites.

13 Claims, 3 Drawing Sheets

(51) Int. Cl.
    *G01S 13/90*     (2006.01)
    *G01S 19/25*     (2010.01)
    *G01S 19/37*     (2010.01)

(56) References Cited

U.S. PATENT DOCUMENTS

| | | | |
|---|---|---|---|
| 2010/0039313 A1 | 2/2010 | Morris | |
| 2014/0062781 A1* | 3/2014 | Mathews | G01S 19/246 342/357.64 |
| 2014/0361939 A1 | 12/2014 | Duncan et al. | |

FOREIGN PATENT DOCUMENTS

| | | |
|---|---|---|
| EP | 2980607 A1 | 2/2016 |
| GB | 2341995 A | 3/2000 |
| JP | 3001405 B2 | 1/2000 |

OTHER PUBLICATIONS

Swedish Office Action for Swedish Patent Application No. 1751209-6, dated May 31, 2018, (7 pages), Swedish Patent and Registration Office.

Weiss, Matthias. *Determination of Baseline and Orientation of Platforms for Airborne Bistatic Radars*, Proceedings. 2005 IEEE International Geoscience and Remote Sensing Symposium, (2005), pp. 1967-1970. IGARSS '05., Seoul, 2005.

Wang, Wen-Qin. *Measurement of Baseline and Orientation Between Aerospace Platforms*, Hindawi Publishing Corporation, The Scientific World Journal, vol. 2013, Article ID 985601, (9 pages). DOI: 10.1155/2013/985601.

\* cited by examiner

METHOD FOR DETERMINING A SYNTHETIC APERTURE OF A SAR USING GNSS

CROSS REFERENCE TO RELATED APPLICATIONS

This application is a National Stage Application, filed under 35 U.S.C. 371, of International Application No. PCT/SE2018/050956, filed Sep. 19, 2018, which claims priority to Swedish Application No. 1751209-6, filed Sep. 29, 2017; the contents of both of which are hereby incorporated by reference in their entirety.

BACKGROUND

Related Field

The present invention relates to a method for determining a synthetic aperture in a synthetic aperture radar, SAR. The present invention relates in particular to a method for determining a synthetic aperture in a SAR using a Global Navigation Satellite System, GNSS.

Description of Related Art

Synthetic aperture radar, SAR, uses a mobile radar station that travels in a defined path. Information about the path is used to reconstruct a radar image from data obtained by the SAR. The synthetic aperture is defined by a plurality of pulses transmitted by the mobile radar station and received radar echoes. In a typical SAR system the mobile radar station is attached to a moving platform such as an aircraft or spacecraft. Typically, the larger the aperture the higher the image resolution.

Ultra high-resolution Synthetic Aperture Radar, SAR, systems, traditionally require an extra ground GNSS (GPS) ground reference system when the resolution of the SAR is close to the wavelength of the radar signals, e.g. SAR in the VHF band or UHF band. This is called RTK (Real Time Kinematic) differential GPS solutions. Conventional INS NAV and GNSS (GPS) systems generate absolute position for navigation in e.g. real-time.

In order to provide high quality images from the SAR system precise information about the path travelled by the mobile radar system is required. This information may be provided directly by a GNSS, but in some applications the precision from positions obtained by a GNSS is not sufficient.

A goal of the present invention is to provide an improved method for obtaining precise information about the path travelled by the SAR system by means of a GNSS needed for determining the synthetic aperture.

BRIEF SUMMARY

An object of the present disclosure is to provide a method which seeks to mitigate, alleviate, or eliminate one or more of the above-identified deficiencies in the art and disadvantages singly or in any combination.

An object of the present disclosure is to provide precise information about the path travelled by a SAR system between transmitting the radar signal and receiving the radar signal in order to determine the synthetic aperture of the SAR.

In this disclosure, a solution to the problem outlined above is proposed. In the proposed solution, the SAR system uses information from a plurality of satellites in the GNSS in order to determine the synthetic aperture. The synthetic aperture is determined using phase information from a maximum correlation peak of a pseudo random number, PRN. The PRN is a unique number assigned to each satellite in the GNSS, and the PRN is transmitted from each satellite in the GNSS by means of a radio frequency signal. Accordingly, the SAR system is configured to perform the correlation of the PRN number and the associated phase information.

According to a first aspect of the present invention, these objects are achieved by a method for determining a synthetic aperture of a synthetic aperture radar, SAR, system using information from a global navigation satellite system, GNSS, which includes a plurality of satellites each transmitting a radio frequency signal comprising a unique pseudo random number, PRN, the method comprising: receive the radio frequency signal from a group of satellites in the GNSS; determining a first maximum correlation peak of the PRN of the received radio frequency signal from each satellite in the group of satellites; determining the phase shift between the first determined maximum correlation peak and a second determined maximum correlation peak of a received PRN from the same satellite at a later time, for each satellite in the group of satellites; determine a line-of-sight, LOS, movement of the SAR system relative each of the satellites in the group of satellites by means of the determined phase shift for each satellite in the group of satellites; determining a synthetic aperture using the LOS movement relative each satellite in the group of satellites.

According to an aspect, the determining a position of the SAR system at the first time or the second time is performed by means of the global positioning system.

According to an aspect the method, further comprising estimating the position of the SAR system using a motion model.

According to an aspect, when at least three satellites are identified, a three dimensional displacement vector may be obtained.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE FIGURES

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF VARIOUS EMBODIMENTS

Aspects of the present disclosure will be described more fully hereinafter with reference to the accompanying figures. The assembly disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present invention relates to synthetic aperture radar, SAR. The SAR concept is utilized in many different applications for radar. Essentially, the SAR uses a mobile radar station that transmits a plurality of radar pulses, or radar signals, and receives the radar echo, when travelling a distance. The number of transmitted pulses is used for determining a synthetic aperture of the SAR. Without going into the exact SAR equations one can conclude that a large number of transmitted pulses (and received radar echoes) when travelling a distance gives a large synthetic aperture that in turn provides a possibility to obtain good image quality. The length of the synthetic aperture determines the SAR image resolution, and accuracy regarding the knowledge of the flight path determines the SAR image quality.

More specifically, the invention relates to a method for determining a synthetic aperture using information readily available in a GNSS, namely the unique pseudo random number, PRN, transmitted from each satellite in the GNSS.

Figure 1A:
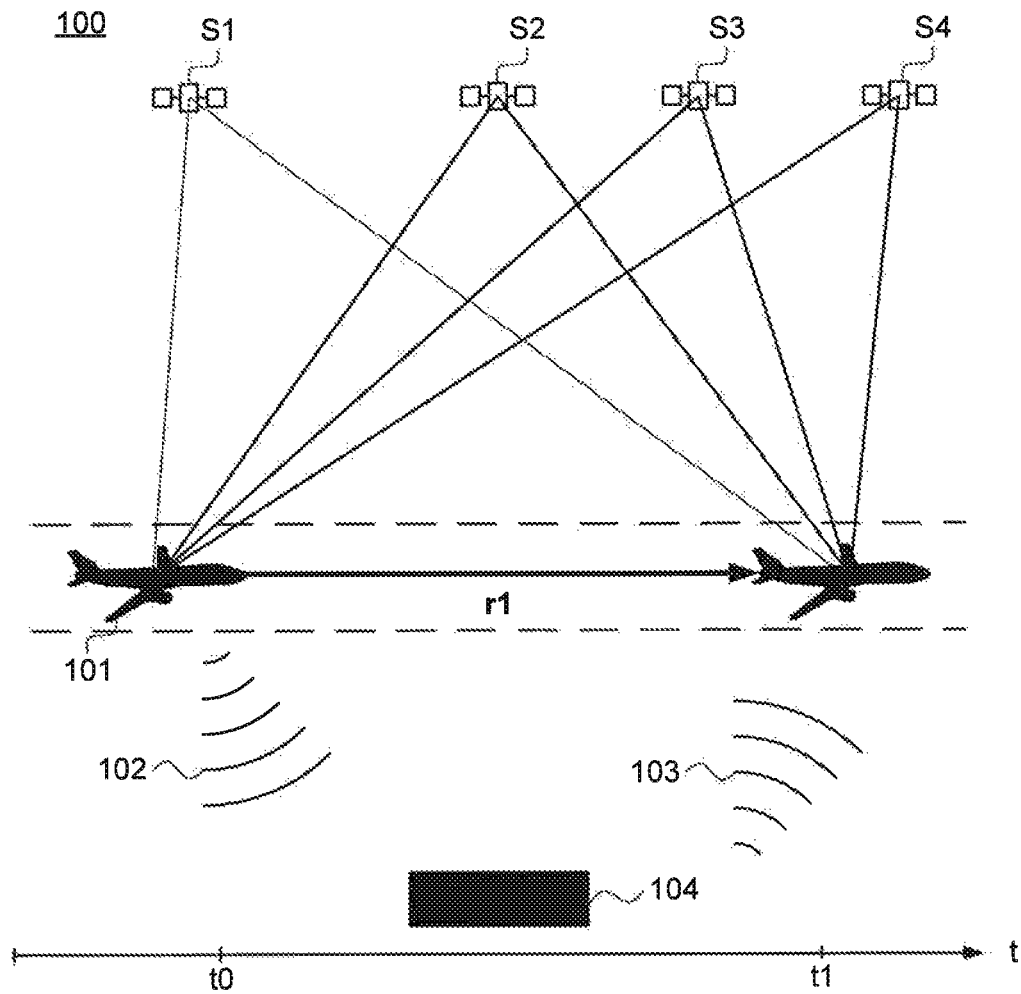
FIG. 1a discloses a schematic view of a mobile SAR system on an airplane with a GNSS.

FIG. 1 discloses a global navigation satellite system, GNSS, generally denoted 100. In this figure only four satellites S1-S4 are shown. An example of a GNSS is the Global positioning system, GPS. An airplane 101 is equipped with a synthetic aperture radar, SAR, system. The airplane 101 transmits a radar signal 102 at a first time t0, the airplane 101 travels a distance indicated by a displacement vector r1 and then receives a radar echo 103 reflected by a ground object, such as a building 104, at a later second time t1. The displacement vector r1 may be used to determine the synthetic aperture of the SAR.

A coarse calculation of the displacement vector r1 may be performed by obtaining the position of the airplane at the first time t0 and the second time t1 directly from the GNSS. However, this calculation lacks the required precision in order to obtain good SAR images.

The present inventor has realized that a more precise calculation of the displacement vector r1 may be performed by using information sent by the satellites in the GNSS. Each satellite in the GNSS transmits a unique pseudo random number, PRN, which is unique for each satellite and is used for determining the identity of the satellite among other things. In the SAR system a correlator is used to determine the received PRN and the associated identity of the satellite. The correlator determines a maximum correlation peak of the PRN and the phase thereof. This determining is performed at least at the first time t0 and the second time t1, but in a preferred embodiment many more times. By determining the phase difference between consecutive maximum correlation peaks a line of sight, LOS, distance may be calculated from the satellite and the airplane, and by doing this for a plurality of satellites the displacement vector may be calculated very precisely.

Figure 1B:
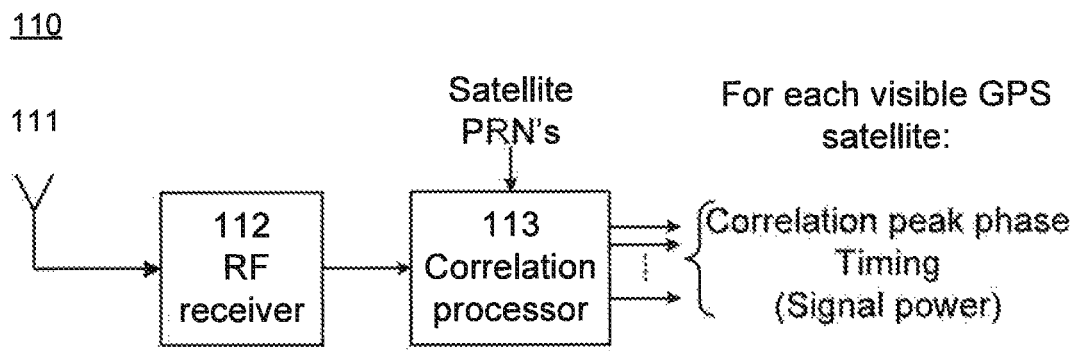
FIG. 1b discloses a standalone GNSS (GPS) processing system.
Figure 2:
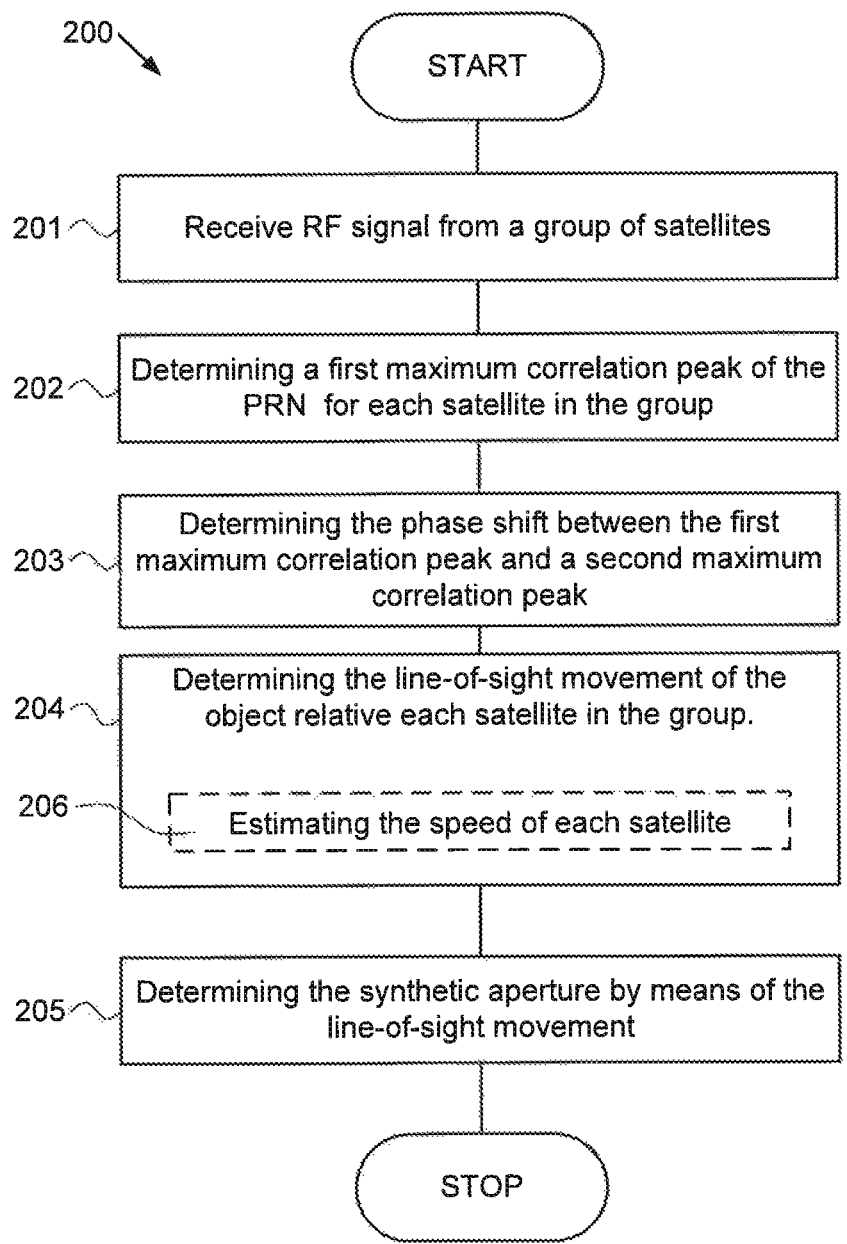
FIG. 2 discloses a flow diagram illustrating an embodiment of a method for determining a synthetic aperture according to an embodiment of the invention.

The airplane 101 is equipped with a standalone GNSS (GPS) processing system 110, as illustrated in FIG. 1b, which comprises a GPS receiver 111 providing information to the RF receiver 112. A correlation processor 113 receives RF signal from the RF receiver and information regarding the satellite PRN's. For each visible GPS satellite, the correlation processor 113 calculates correlation peak phase, timing and optionally signal power. This information is used to calculate the displacement vector as illustrated in FIG. 2.

This method is further described below with reference made to a flow diagram 200 in FIG. 2. The method comprises:

A first step 201 which involves, receiving the radio frequency signal from a group of satellites S1-S4 in the GNSS 100 by a SAR system.

A second step 202 which involves, determining a first maximum correlation peak of the PRN of the received radio frequency signal from each satellite in the group of satellites.

A third step 203 which involves, determining the phase shift between the first determined maximum correlation peak and a second determined maximum correlation peak of a received PRN from the same satellite at a later time, for each satellite in the group of satellites.

A fourth step 204 which involves, determining a line-of-sight, LOS, movement of the SAR system relative each of the satellites in the group of satellites by means of the determined phase shift for each satellite in the group of satellites.

A fifth step 205 which involves, determining a synthetic aperture using the LOS movement relative each satellite in the group of satellites.

The fourth step may comprise an additional step in which the speed of each satellite in the group of satellites is estimated (206) for determining the relative movement of the SAR system in relation to each satellite.

A ground object—which can be detected in the obtained SAR image—is positioned in an external coordinate system by its position in the SAR image's coordinates (row pixel no. and column image pixel no. in the image) and transform the SAR image coordinate systems to an external coordinate system. This transformation is governed by location, length and direction of the synthetic aperture (for the SAR image). Errors in the knowledge of the synthetic aperture's location, length and direction will affect the position estimate (in the external coordinate system) for the ground object in the SAR image.

Using the signals from the GNSS satellites in the described method yields the LOS distance shift for each of the GNSS satellites. Using several measurements of such LOS distances for several GNSS satellites, the three-dimensional displacement vector of the SAR system can be determined. Using several such measurements for the entire time for the SAR system to traverse the synthetic aperture, the form of the synthetic aperture can thus be determined. A sufficiently good estimate of the form of the synthetic aperture then yields a SAR image with high quality. The horizontal projection of the direction vector for the synthetic aperture and the horizontal projection of the location of the synthetic aperture do not affect the quality of the obtained SAR image. The quality is affected by the other parameters, e.g. the length of the synthetic aperture, vertical component of the direction vector for the synthetic aperture and the vertical component of the location of the synthetic aperture (i.e. the height), and as most importantly the internal shape and form of the synthetic aperture.

The method yields also a direct and compact relation between errors in the GNSS system for forming the LOS distance shifts and the length and direction of the synthetic aperture. This relation can be used to accurately predict parts of the accuracy of the position for ground objects visible in the SAR image. The needed final part, i.e. the (absolute) position of the synthetic aperture (in an external coordinate system), is not directly provided by the described method. The absolute position of the synthetic aperture (in an external coordinate system) can be supplemented by using the GNSS signals for conventional GNSS navigation.

In one embodiment a coarse displacement vector is obtained by means of an airplane model which provides a coarse model of the path of the airplane. This coarse displacement vector is used a starting value for calculating the synthetic aperture using the LOS distances.

In one embodiment the group of satellites comprises at least four satellites in order to calculate three positions and time.

Motion Model for Slow Air Born Platforms Having a SAR System

As mentioned above, the PRN is unique for each GPS satellite and the PRN code is broadcasted with a rate of 1 kHz. The following considerations are applicable to the present invention:

Maximum movement ($\Delta L$) between phase measurements: $\lambda_{GPS} \approx 0.2$ m => $\Delta L < \lambda_{GPS}/2$, $\lambda_{GPS}$ is the wavelength of the transmitted GPS signal.

Maximum time gap ($\Delta t$) between phase measurements: $\Delta t < \lambda_{GPS}/2v$, v is speed of platform.

For platform speeds between 25-150 m/s this comes to maximum time gap $\Delta t$ of 0.7-4 ms, and GPS PRN phase measurements need to be performed at a rate higher than 250-1500 Hz.

Thus a standalone solution for slow air born platforms is provided.

The motion model may in its simplest form comprise a maximal acceleration for the platform, such as an airplane.

Dynamic Motion Model for Air Born Platforms Having a SAR System

For platforms with higher speeds than 100 m/s, a dynamic motion model has to be implemented. The maximum movement change between phase measurements is, as for slow air born platforms, half the GPS signal wavelength: $\Delta L < \lambda_{GPS}/2$.

The maximum time gap between phase measurements assuming an unknown maximum platform acceleration: $\Delta t < \sqrt{\lambda_{GPS}/a}$, a is acceleration of the platform.

For maximum platform acceleration "a" this comes to a maximum time gap "$\Delta t$" as illustrated in table 1 below.
a(m/s²) $\Delta t$ (s)
0.5 0.2
2.0 0.1
5.0 0.06

As a result, GPS PRN phase measurements need to be performed at a rate higher than 5 Hz for a=0.5, 10 Hz for a=2.0 and 16 Hz for a=5.0. Thus the dynamic motion model may be used for most air born platforms since GPS receivers can handle this rate.

Satellite movements are included in the phase measurements, which movement is approximately 4 km/s. Maximum relative velocity is 930 m/s (850 m/s at 10° elevation mask). The satellite orbital speed $v_{sat}$ may be expressed as:

$$v_{sat} \cong \sqrt{\frac{GM}{r_{sat}}}$$

Satellite speed stability $\Delta v_{sat}$ may be expressed as:

$$\Delta v_{sat} \approx \frac{\Delta r_{sat}}{2 r_{sat}} \sqrt{\frac{GM}{r_{sat}}}$$

The satellite orbital knowledge is assumed to be 10 m, and based on this assumption, the satellite speed unknown variations is ≈0.7 mm/s and the uncertainty in LOS angle to satellite is <<$10^{-6}$ radians (i.e. <<$10^{-4}$ degrees). Thus the uncertainty in satellite speed is less than ≈0.6 mm/s.

Figure 3:
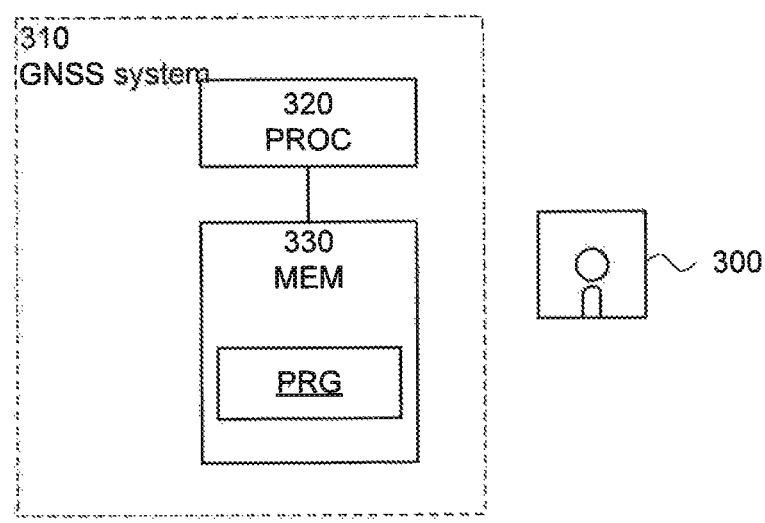
FIG. 3 is a schematic drawing of a system with a processor and a memory containing instructions for executing a method according to an embodiment of the present invention.

According to some embodiments, a computer program product comprises a computer readable medium such as, for example a universal serial bus (USB) memory, a plug-in card, an embedded drive or a read only memory (ROM). FIG. 3 illustrates an example computer readable medium in the form of a compact disc (CD) ROM 300. The computer readable medium has stored thereon a computer program comprising program instructions. The computer program is loadable into a data processing unit (PROC) 220, which may, for example, be comprised in a GNSS system 310. When loaded into the data processing unit, the computer program may be stored in a memory (MEM) 530 associated with or comprised in the data processing unit. According to some embodiments, the computer program PRG may, when loaded into and run by the data processing unit, cause execution of method steps according to, for example, the method illustrated in FIG. 2 or otherwise described herein.

The person skilled in the art realizes that the present invention by no means is limited to the preferred embodiments described above. On the contrary, many modifications and variations are possible within the scope of the appended claims.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

The invention claimed is:

1. A method for determining a synthetic aperture of a synthetic aperture radar, SAR, system using information from a global navigation satellite system, GNSS, which includes a plurality of satellites each transmitting a radio frequency signal comprising a unique pseudo random number, PRN, the method comprising:
    receiving (201) the radio frequency signal from a group of satellites in the GNSS;
    determining (202) a first maximum correlation peak of the PRN of the received radio frequency signal from each satellite in the group of satellites;
    determining (203) the phase shift between the first determined maximum correlation peak and a second determined maximum correlation peak of a received PRN from the same satellite at a later time, for each satellite in the group of satellites;
    determining (204) a line-of-sight, LOS, movement of the SAR system relative each of the satellites in the group of satellites by means of the determined phase shift for each satellite in the group of satellites; and
    determining (205) a synthetic aperture using the LOS movement relative each satellite in the group of satellites.

2. Method according to claim 1, further comprising determining a position of the SAR system at the first time or the second time by means of the global positioning system.

3. Method according to claim 1, further comprising estimating the position of the SAR system using a motion model.

4. Method according to claim 1, wherein the identifying of a plurality of satellites is performed by means of the unique PRN for each satellite.

5. Method according to claim 1, wherein at least three satellites are identified, whereby a three dimensional displacement vector is obtained.

6. Method according to claim 1, further comprising estimating (206) the speed of each satellite in the group of satellites for determining the relative movement of the SAR system in relation to each satellite.

7. A computer program product comprising a non-transitory computer readable medium (300), having thereon a computer program comprising program instructions, the computer program being loadable into a data processing unit (320) and configured to cause execution of the method according to any of claims 1 through 6 when the computer program is run by the data processing unit.

8. A system for determining a synthetic aperture of a synthetic aperture radar, SAR, system using information from a global navigation satellite system, GNSS, which includes a plurality of satellites each transmitting a radio frequency signal comprising a unique pseudo random number, PRN, wherein the system is configured to:
    receive the radio frequency signal from a group of satellites in the GNSS;
    determine a first maximum correlation peak of the PRN of the received radio frequency signal from each satellite in the group of satellites;
    determine the phase shift between the first determined maximum correlation peak and a second determined maximum correlation peak of a received PRN from the same satellite at a later time, for each satellite in the group of satellites;
    determine a line-of-sight, LOS, movement of the SAR system relative each of the satellites in the group of satellites by means of the determined phase shift for each satellite in the group of satellites; and
    determine a synthetic aperture using the LOS movement relative each satellite in the group of satellites.

9. System according to claim 8, further configured to determine a position of the SAR system at the first time or the second time by means of the global positioning system.

10. System according to claim 8, further configured to estimate the position of the SAR system using a motion model.

11. System according to claim 8, wherein the system is further configured to identify a plurality of satellites by means of the unique PRN for each satellite.

12. System according to claim 8, wherein the system is further configured to identify at least three satellites, whereby a three dimensional displacement vector is obtained.

13. System according to claim 8, wherein the system is further configured to estimate the speed of each satellite in the group of satellites for determining the relative movement of the SAR system in relation to each satellite.

* * * * *